United States Patent [19]

Sato

[11] 4,242,220
[45] Dec. 30, 1980

[54] WASTE DISPOSAL METHOD USING MICROWAVES

[76] Inventor: Gentaku Sato, No. 33, Ichigaya Sanai-cho, Shinjuku-ku, Tokyo, Japan, 162

[21] Appl. No.: 929,808

[22] Filed: Jul. 31, 1978

[51] Int. Cl.² .............................................. G21F 9/08
[52] U.S. Cl. .................. 252/301.1 W; 34/1; 34/4; 34/12; 34/19; 210/770; 264/0.5; 264/26; 264/109; 264/DIG. 69
[58] Field of Search .................. 252/301.1 W; 264/26, 264/0.5, 109, DIG. 69; 210/68; 159/DIG. 12; 34/1, 4, 12, 19

[56] References Cited

U.S. PATENT DOCUMENTS

| | | | |
|---|---|---|---|
| 2,966,469 | 12/1960 | Smythe et al. | 219/10.41 |
| 3,487,132 | 12/1969 | Thorne | 264/25 |
| 4,033,868 | 7/1977 | Meichsner et al. | 210/68 |
| 4,043,047 | 8/1977 | Galliker | 210/68 |
| 4,094,784 | 6/1978 | Hirano | 210/68 |

FOREIGN PATENT DOCUMENTS 2734147 2/1978 Fed. Rep. of Germany ... 252/301.1 W
1414073 11/1975 United Kingdom .

OTHER PUBLICATIONS

Blance, R. E. et al., "Incorporating Industrial Wastes in Insoluble Media", *Chem. Eng. Prog.*, vol. 66, No. 2, pp. 51-56 (Feb. 1970).

*Primary Examiner*—Benjamin R. Padgett
*Assistant Examiner*—Deborah L. Kyle
*Attorney, Agent, or Firm*—Lackenbach, Lilling & Siegel

[57] ABSTRACT

Waste such as sludge containing poisonous substances is processed into a safe article by removing water in a usual manner, drying the waste to substantial dryness by microwave heating, mixing the dry waste powder with a thermoplastic resin, irradiating the mixture with microwaves to encapsulate the waste particles with the resin and to heat polymerize the resin, and molding the resin encapsulated particles into an article.

8 Claims, 1 Drawing Figure

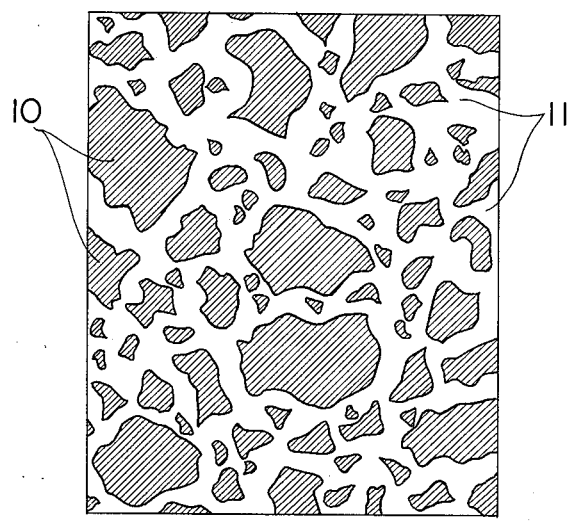

WASTE DISPOSAL METHOD USING MICROWAVES

BACKGROUND OF THE INVENTION

This invention relates to the treatment of waste containing poisonous substances.

The term "waste" used herein includes solid industrial wastes such as sludge, slag and red mud as well as municipal refuse such as garbage and ash. The term "poisonous substances" means toxic or polluting materials including heavy metals such as cadmium, mercury, lead and arsenic, and sulfides, cyanides and organic phosphorus compounds as well as radioactive materials.

A number of techniques have been proposed to treat waste containing poisonous substances so as to prevent the poisonous substances from leaching out. Such techniques are basically classified into two methods. One method chemically renders poisonous metals insoluble using chelating agents such as EDTA and NTA. Insolubilization is not always complete and reaction conditions are restricted. Further, this method is expensive. Another method pertains to physical encapsulation of poisonous substances. Cement, concrete, asphalt, resin, or glass may be used. However, they are either expensive or insufficient in their confinement abilities.

The primary object of this invention is to process sludge into resin clad capsules so as to seal poisonous substances using a microwave technique wherein the capsules can be kept unchanged substantially eternally, and prevent poisonous substances from leaching or eluting when contacted with water, and allow the processed sludge to be bonded into a solid shape.

Another object of this invention is to manufacture articles from waste containing poisonous substances by encapsulating the waste particles with a resin and forming the capsules into an article which is suitable for use as building blocks, road pavements or undersea fish shelters.

A further object of this invention is to provide an economical method of treating sludge containing poisonous substances by encapsulating sludge particles with a resin wherein a waste thermoplastic synthetic resin may be used as the encapsulating resin.

BRIEF DESCRIPTION OF THE DRAWING

The single FIGURE is a schematic illustration of a microphotograph showing a cross section of an article obtained in accordance with the present invention.

DETAILED DESCRIPTION

The above described objects and advantages can be attained by the present invention, an embodiment of which is described in detail hereinafter. The following description refers to sludge as a typical waste.

(a) Water Removal

Sludge is reduced by means of any conventional equipment to a water content of 65-70% by weight. Sludge squeezers, vacuum filters, centrifugal filters or the like may be used in this step.

(b) Drying

The sludge is directly or indirectly heated to remove residual water in a dryer by burning fuel oil. During this heating, the sludge is stirred and vibrated so that organic material such as bark, straw, sawdust and other material liable to burn on heating may not be ignited or burnt. If these materials are burnt, the desired end product cannot be obtained. This drying will result in a residual water content of the sludge of about 12-13% by weight as far as burning is prevented. It is to be noted that a minimum water content of about 4% will eventually remain in the form of water of crystallization.

(c) Microwave Drying

The sludge is then placed in a vessel equipped with 4-6 microwave oscillators having an output of 5 kW. The vessel is also equipped with a rotary feeder. Microwaves are applied to the sludge to heat the sludge through dielectric heating upon transmission to further reduce the residual water content thereof to 0.1-5% by weight. Stirring is also conducted throughout this heating. Reduction of the water content to such low levels weakens the coalescence between sludge particles and the sludge thus becomes powdery. This process is assisted by stirring.

For microwave irradiation, a klystron may be used at a frequency of 915 or 2450 Mc/s, for example.

(d) Cooling

The thus dried sludge powder is conveyed, for example, by a screw conveyor through which cold air is blown to cool the sludge to room temperature or about 30° C.

(e) Mixing

The cooled sludge powder is introduced in a mixer to which a thermoplastic resin is also charged.

Unless the sludge has been cooled at this stage, the thermoplastic resin will prematurely melt to agglomerate sludge powder into a mass before the subsequent microwave irradiation. In this case, encapsulation is only partly accomplished and heavy metal will leach out where encapsulation is imperfect.

(f) Microwave Heating

The cooled mixture of sludge powder and thermoplastic resin is introduced into a vessel. With stirring, the mixture is irradiated with microwaves. The thermoplastic resin is melted to encapsulate the fine particles of sludge. Upon cooling, the resin sets to cover the sludge particles completely. Each sludge particle is enclosed or confined by a resin coating.

(g) Molding

A suitable amount of the resin encapsulated sludge particles is molded into an article having a desired shape. Such articles are ready for use as building blocks or boards with or without a laminated surface layer. The articles may also be used for road construction, fish nesting and other applications.

In the above-mentioned method of the present invention, polyethylene, particularly modified moderate-pressure polyethylene is preferred as the thermoplastic resin to be mixed with the waste powder. Waste sludge thermoplastic resin may also be used. In this case, not only waste material as exemplified by sludge, but also waste plastics are recycled in a useful manner.

The present invention employs microwave heating to dry hydrous waste and to heat a mixture of waste and resin because uniform heating can be expected. By selecting the frequency of microwave and a heating time, encapsulating resin and water and heavy metals in the sludge may be heated to appropriate different levels, respectively. The combination of dielectric heating and induction heating and the preference of dielectric heating of either water or resin may suitably be selected to this end. In addition, microwave irradiation provides the sludge particles with a resonance effect to further divide them. Further, uniform distribution of sludge particles in a resin which is attained by mechanical stirring is enhanced by the resonance vibration.

According to the present invention, poisonous substances in sludge or the like are substantially confined in an encapsulating material.

Encapsulation achieved by the present invention is shown in the single FIGURE attached. This FIGURE is based on a 50x magnification microphotograph, but is not drawn to scale. As seen from the FIGURE, sludge particles 10 are apparently independently embedded in a resin 11.

Experiments were made using a sludge which contained 160.6 ppm of cadmium and 0.06 ppm of hexavalent chromium. Samples were molded using moderate-pressure polyethylene in accordance with the present invention. It was found that no heavy metals leached out from the sample under leaching tests.

When waste contains radioactive materials, a mixture of sludge powder and porous pearlite powder is added to the waste. The mixture may consist of 50 parts by weight of sludge powder (obtained from paper manufacturing mills or red mud resulting from the Bayer's process) and 50 parts by weight of pearlite powder. It is preferable to add 20 to 30% by weight of such a powder mixture to the waste. The radioactive materials are absorbed in the mixture, which may be treated in accordance with the present invention. In this case, a lead-containing resin is preferred. It is to be noted that the resulting product should be stored in the usual manner known in the art.

What is claimed is:

1. A method of manufacturing a safe article from a water-containing waste having poisonous substances, comprising the steps of:
    (a) removing a major portion of water contained in the waste,
    (b) stirring the waste during the subsequent steps except for the last step,
    (c) drying the waste to a residual water content of about 12–13% by weight, without igniting flammable material contained in the waste,
    (d) microwave heating the waste to further reduce the residual water content to 0.1–5% by weight so that the waste becomes powdery,
    (e) cooling the waste powder to room temperature,
    (f) contacting the waste powder with a thermoplastic resin,
    (g) microwave heating the mixture of the waste powder and the thermoplastic resin at a rate which enables the resin to melt and encapsulate the waste powder particles, and
    (h) molding the resin encapsulated particles into an article having a desired shape.

2. A method as set forth in claim 1 wherein said waste is sludge.

3. A method as set forth in claim 2 wherein said sludge contains heavy metals.

4. A method as set forth in claim 1 wherein said thermoplastic resin is polyethylene.

5. A method as set forth in claim 1 wherein said thermoplastic resin is a waste thermoplastic resin.

6. A method as set forth in claim 1 wherein the water content of the waste is reduced to 65–70% by weight during the water removing step.

7. A method as set forth in claim 1 wherein the waste is vibrated to enhance stirring effect.

8. A method as set forth in claim 1 wherein in the case of a waste containing radioactive materials, the waste is combined with a powdery mixture of sludge and porous pearlite before it is subjected to the water removing step.

* * * * *